J. P. STOTT.
GRAIN-SEPARATOR.

No. 178,200. Patented May 30, 1876.

Attest:
M. F. Boyle.
Jno. A. Madigan

Inventor:
John P. Stott,
by Louis Bagger & Co.
his Attys.

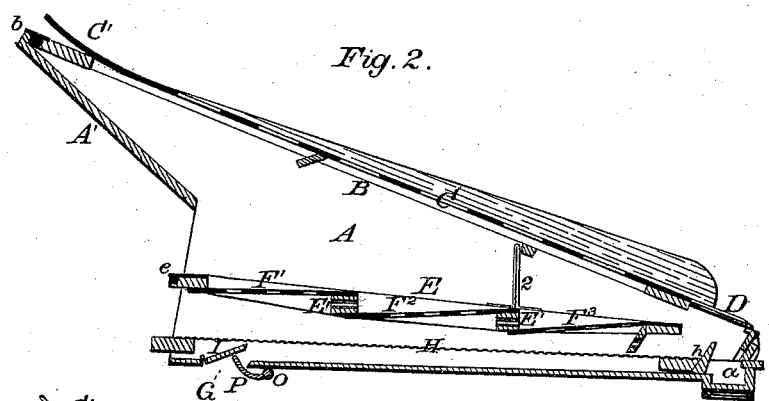
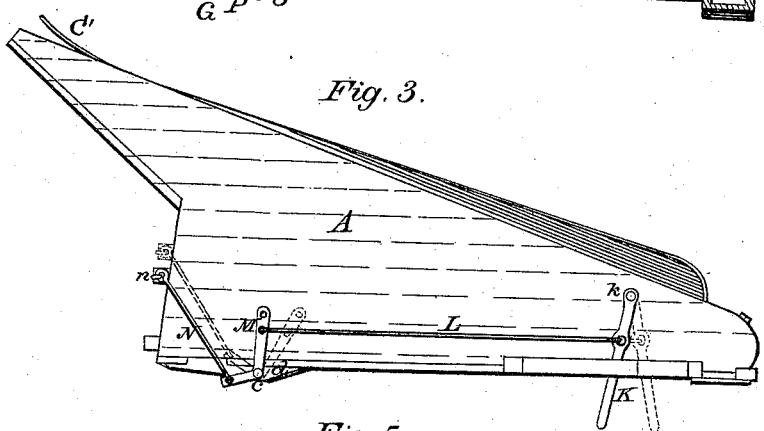
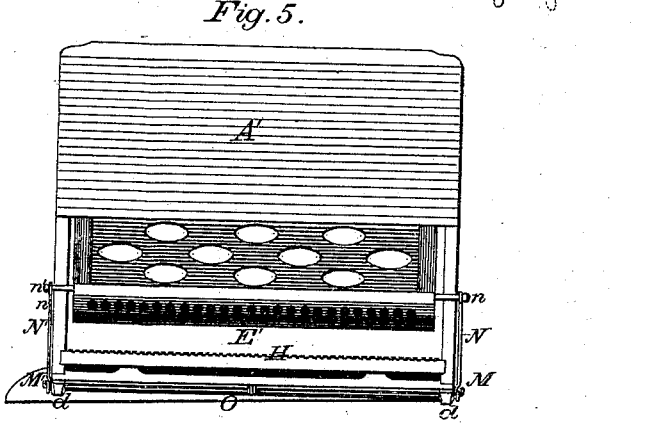

UNITED STATES PATENT OFFICE.

JOHN P. STOTT, OF BAYARD, ASSIGNOR OF PART OF HIS RIGHT TO FREDERIC MILLER AND JACOB WALKER, OF MINERVA, OHIO.

IMPROVEMENT IN GRAIN-SEPARATORS.

Specification forming part of Letters Patent No. 178,200, dated May 30, 1876; application filed March 25, 1876.

*To all whom it may concern:*

Be it known that I, JOHN P. STOTT, of Bayard, in the county of Columbiana and State of Ohio, have invented certain new and useful Improvements in Grain-Separators; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to certain improvements in the construction of the shoe of thrashing-machines, in which the grain is cleaned from dust, chaff, and straw by the winnowing process; and it consists in the construction and arrangement of the operative parts, in the manner and for the purpose hereinafter more fully described, and pointed out in the claims.

Figure 1:
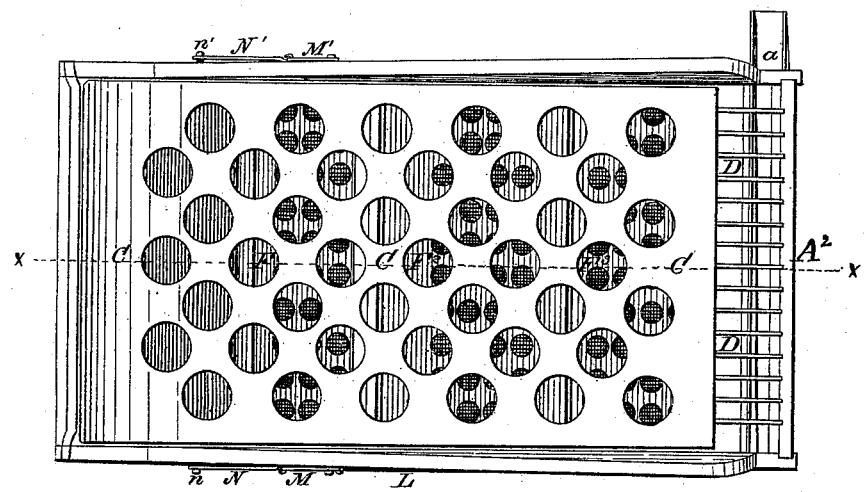
Figure 4:
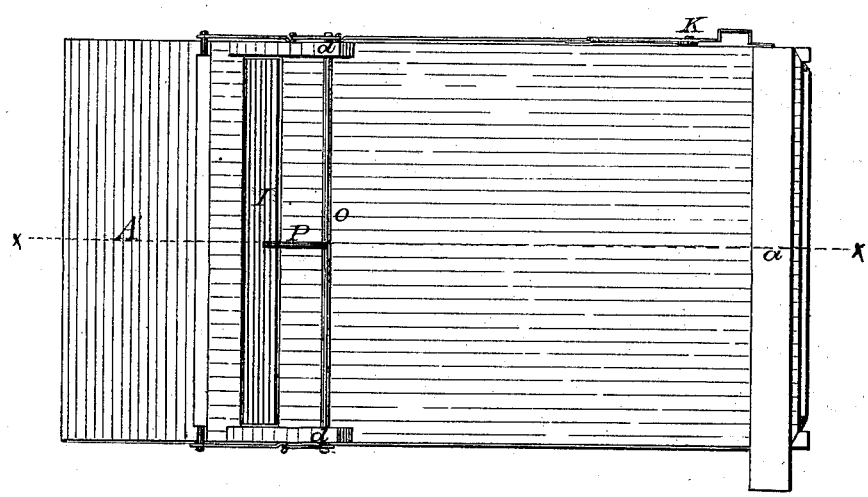

In the drawing, Figure 1 represents a top plan. Fig. 2 is a vertical section in the plane indicated by line $x\, x$ in Figs. 1 and 4. Fig. 3 is a side elevation. Fig. 4 is a bottom plan, and Fig. 5 is an elevation of the front or feed end.

Similar letters of reference indicate corresponding parts in all the figures.

A is the shoe, affixed to the rear end of which, and forming part of the same, is the feed board or chute $A^1$. B is a frame, pivoted to the upper front part of the shoe, at $b$, upon which is affixed a screen or sieve, C. This consists of a piece of sheet metal, curved in an upward direction at $C'$, so as to give the grain and straw falling upon it a start down over the lower perforated part C. The perforations in the part denoted by C are circular holes, preferably about one inch and a quarter in diameter; and to the rear of frame B is affixed a series of projecting teeth, forming a rake, D, which, when the sieve C is in the position shown in Fig. 1, abut against the top edge of the tail-board $A^2$, so as to reach over and cover the spout $a$. Underneath frame B is another sieve-frame, E, pivoted to the rear end of the shoe at $e$. Frame E is divided by cross-pieces $E'$ into three sections, each of which is covered by a perforated piece of sheet metal, $F^1\, F^2\, F^3$, so as to form a secondary sieve, consisting of three successive steps or raised parts, as shown in Fig. 2. The plates $F^1\, F^2\, F^3$ are perforated by circular holes, preferably about half an inch in diameter; and the cross-pieces $E'$, by which this second sieve F is divided into three raised sections, are also perforated, so as to allow the current of air from the fan-box G to pass through from the front to the rear part of the shoe. Below the secondary sieve E in the bottom of the shoe is affixed a wire screen or riddle, H, abutting against a slanting board, $h$, in the rear part of the shoe. In the bottom of the front end of shoe is an opening, covered by a hinged board or door, I. The sieve C and sieve-frame E may be adjusted relatively to each other by means of the mechanism which I shall now describe. K is a lever, pivoted at $k$, which operates a rod, L, that reaches forward to the bent lever M, pivoted at $c$. To the other arm of lever M is pivoted a rod, N, that reaches up to a staple, $n$, projecting at right angles from the sieve-frame E. Bent lever M also operates a shaft, O, to which it is attached at its fulcrum $c$, which passes across the bottom of the shoe, resting in bearings $d\, d$ at each side. Shaft O has a bent tongue, P, projecting at right angles, which, when lever K is pushed toward the front part of shoe, will press against the cut-off board I, causing it to open. By moving lever K in the opposite direction, the screen-board I will close by its own weight, tongue P (which supports it in its open position) being withdrawn from it.

To the other end of shaft O is secured an arm, $M'$, at right angles from which a rod, $N'$, passes up to a staple, $n'$, projecting at right angles from the frame E, opposite to staple $n$. Thus it will be seen that by pushing lever K toward the front end of shoe the cut-off I is closed, and the front part of frame E is lowered, while by moving it in the opposite direction the cut-off I is pushed open by tongue P, and the front end of frame E is raised. Affixed upon frame E are two uprights, 2 2, one at each side, which serve as supports for the upper frame B, pivoted at $b$. When, therefore, frame E is lowered, it follows that the rear portion of the upper frame B, which rests upon the supports 2 2, is lowered also, while, if frame E is raised, the rear part of upper frame B will be raised. Frames B and E being pivoted at opposite ends, it follows that the operation of raising them reduces the angle, relative to each other, at which they are placed in the shoe, while by lowering them from their respective pivoting-points the angle at which they are placed is made more acute.

From the foregoing description the operation of the machine may be readily understood. The grain, as it comes from the thrashing-machine, is placed upon the inclined slide C' of the top sieve C, which gives it a start down over the sieve. The grain and chaff are scattered over sieves $F^1$, $F^2$, and $F^3$ below, while the long straw is carried off over the perforations in sieve C and the rake D. While falling from the upper to the lower sieve, and also while dropping from step to step of the latter, the grain is subjected to the air-current from the fan blowing in the direction of the arrows, which thoroughly cleanses it of chaff, dust, and tailings, these, with other impurities, being blown forward into the elevator-trough $a$.

It will be observed that the air-current passes not only in an upward direction through the space between sieves C and F, but also in a straight horizontal direction through the perforations in the cross-pieces E', thereby subjecting the grain to a twofold and thorough action—viz., first, while it falls from the upper to the lower sieve, and, secondly, while it, in being forced rearward by the current, drops from step to step of the latter. The slanting board $h$, placed at the hind end of wire screen H, forces that part of the air-current which passes under sieves $F^1$ $F^2$ $F^3$, up against and through the rake D, thereby preventing it from being choked up by the straw.

In cleaning wheat, rye, barley, buckwheat, &c., lever the K should be pushed toward the rear of shoe, so as to decrease the space between sieves C and F at the rear part of shoe, but increase it at the opposite end. This also has the effect of raising the rake D up above the top edge of trough $a$, and of opening the screen-door I, thus allowing the screenings to pass down into the screen-box placed under I. In cleaning oats, where a longer and more powerful action of the blast is required, the lever K is moved in the opposite direction, thereby bringing sieves C and F close together, at a sharp angle, in the rear part of shoe, and closing the screen-door, which compels the grain to work forward to the front end of shoe, all the oats that pass through the screen H being carried the entire distance forward into the screw.

Having thus described my invention, I claim and desire to secure by Letters Patent of the United States—

1. The combination of the shoe A with the swinging sieve-frames B and E, pivoted at opposite ends of the shoe at $b$ and $e$, respectively, substantially as and for the purpose hereinbefore set forth.

2. The combination of the swinging sieve or riddle C with the sieve-frame E, having standards or uprights 2 2, for the support of the upper sieve C, substantially as and for the purpose herein shown and specified.

3. The combination of the lever K, rod L, bent lever M, rod N, and frame E, substantially as and for the purpose herein shown and specified.

4. The combination of the lever K, rod L, bent lever M, rod or shaft O, having tongue P, and hinged screen-door I, substantially as and for the purpose herein shown and specified.

5. The combination of the lever K, rod L, bent lever M, shaft O, having tongue P, lever M', rod N', and frame E, by which the screen-door I and frames E and B are operated simultaneously, substantially in the manner and for the purpose hereinbefore set forth.

In testimony that I claim the foregoing as my own I have hereto affixed my signature in presence of two witnesses.

JOHN PATERSON STOTT.

Witnesses:
JOHN FRELTZ,
WILLIAM + QUIN.